(12) United States Patent
Clifford

(10) Patent No.: US 7,013,166 B2
(45) Date of Patent: Mar. 14, 2006

(54) MULTI-CARRIER RECEIVER ARCHITECTURE

(75) Inventor: Paul Clifford, Fleet (GB)

(73) Assignee: Nokia Corporation, Espoo (FI)

( * ) Notice: Subject to any disclaimer, the term of this patent is extended or adjusted under 35 U.S.C. 154(b) by 20 days.

(21) Appl. No.: 10/630,710

(22) Filed: Jul. 31, 2003

(65) Prior Publication Data

US 2004/0162114 A1    Aug. 19, 2004

Related U.S. Application Data

(60) Provisional application No. 60/444,209, filed on Feb. 3, 2003.

(51) Int. Cl.
*H04B 1/38* (2006.01)

(52) U.S. Cl. .................. 455/562.1; 455/561; 455/296; 342/433; 343/853

(58) Field of Classification Search ............. 455/249.1, 455/296, 561, 562.1; 342/417, 433; 343/853
See application file for complete search history.

(56) References Cited

U.S. PATENT DOCUMENTS

| | | | |
|---|---|---|---|
| 6,157,668 A * | 12/2000 | Gilhousen et al. | 375/130 |
| 6,351,237 B1 * | 2/2002 | Martek et al. | 342/361 |
| 6,546,058 B1 * | 4/2003 | Gilhousen et al. | 375/285 |
| 6,738,609 B1 * | 5/2004 | Clifford | 455/296 |

FOREIGN PATENT DOCUMENTS

EP                921646 A2 *   6/1999

* cited by examiner

*Primary Examiner*—Tho Phan
(74) *Attorney, Agent, or Firm*—Antonelli, Terry, Stout and Kraus, LLP.

(57) ABSTRACT

The present invention relates to a receiver device and method of receiving a radio signal, wherein radio signals are received through at least two respective different receiving paths, combined and processed in a common multi-carrier path. In particular, a carrier of the common multi-carrier path is allocated to each channel signal provided in the combined signals. Signals received from different antenna elements, e.g. sector antennas, can thus be combined together and fed to just one multi-carrier receiver, so that hardware requirements are significantly reduced.

55 Claims, 3 Drawing Sheets

MULTI-CARRIER RECEIVER ARCHITECTURE

This application claims priority from U.S. Provisional Patent Application No. 60/444,209, filed Feb. 3, 2003, the subject matter of which is incorporated herein by reference.

BACKGROUND OF THE INVENTION

1. Field of the Invention

The present invention relates to a receiver device and method for receiving radio signals through at least two receiving paths, e.g. through different/many sector antennas of a base station device.

2. Description of the Prior Art

In cellular communication networks, one way of improving uplink coverage is to increase the number of receiving antennas at a base station. The selection of the particular antenna configuration may depend, for example, on the radio channel characteristics, angular spread, mobile speeds, uplink and downlink capacities, implementation complexity, environmental issues, visual impact of the antennas, network provider's cost/quality of service model, etc.

In a conventional arrangement, each cell is divided into typically three sectors and the base station employs two directional antennas per sector. Each antenna pattern covers the entire sector. Receive diversity is usually applied in the uplink direction (that is from mobile terminal device or user equipment to the base station), while often only one of the two antennas is used for downlink transmission. In receive diversity, a signal is received through both directional antennas in each sector and the antenna with the better reception quality (for example, signal-to-noise ratio or the like) is selected. Thus, receive or antenna diversity leads to an improved base station reception sensitivity. Many methods of maximizing signal quality are available.

FIG. 1 shows a schematic diagram indicating an antenna arrangement 20 with a plurality of isotropic antenna elements 22 arranged in a triangular structure. The antenna arrangement 20 is connected to a base transceiver station 30, which transmits and receives signals using the antenna arrangement 20.

FIG. 2 shows an ideal antenna pattern of the antenna arrangement 20, which comprises three sectors 10 each covering an angular range of about 120 degrees. Each of the sectors of the antenna pattern is mainly generated by those antenna elements 22 that are arranged on the respective side of the triangular structure. However, the real antenna pattern sectors are non-ideal in several ways. There is a non-negligible power radiated in the back and side regions, and the amount of such back and side power generated by back and side lobes 14 is greater for narrow sectors than the amount of power for wide-angle sectors. Back and side lobes generate co-channel interferences. Thus, the number of sectors is selected based on frequency re-use and allowed channel interference.

In the example of the above tri-sector base station configuration with an employed two-antenna receive diversity, each sector 10 may have four transmitter units for downlink transmission through four respective channels, leading to a total of twelve transmitter units per base transceiver station (BTS). To implement receive diversity, each sector 10 requires eight receiver units, four allocated to the four channels of the first or main antenna and another four allocated to the four channels of the second or diverse antenna. Thus, a total of twenty-four receiver units would be required for implementing such a base station configuration.

To alleviate this problem, a new technology, known as multi-carrier technology has been developed, where multiple parallel narrowband carriers are used for parallel transmission and reception of the channel signals of a sector antenna by respective single transmitter and receiver units, respectively. Thus, the number of transmitter and receiver units can be reduced down to two receiver units and one transmitter unit per sector 10. This results in a total of three transmitter units per BTS and six receiver units per BTS.

SUMMARY OF THE INVENTION

It is an object of the present invention to provide an improved receiving scheme by means of which the number of receiver units can be further reduced.

This object may be achieved by a receiver device that includes:

at least two receiving elements for receiving radio signals through at least two respective different receiving paths;

combination circuit means for combining signals received through the at least two different receiving paths; and common receiver means for processing the combined signals in a common multi-carrier path.

Additionally, the above object may be achieved by a method of receiving a radio signal. The method may include the steps of:

receiving radio signals through at least two respective different receiving paths;

combining signals received through the at least two different receiving paths; and processing the combined signals in a common multi-carrier path.

Accordingly, signals received from different receiving paths, for example, all receive sector antennas (main receivers and separate diverse receivers), may be combined together and fed to just two multi-carrier receivers. The signals of all of the main sector antennas, for example, three in the above specific example, may be combined and then fed to just one receiver unit of a multi-carrier structure. The same may apply to the diverse path. Thus, the number of receiver units can be reduced to a minimum of two. While the shown embodiment is for three sectors, any reasonable number of sectors may also be used such as up to six sectors, for example.

In the receiver device according to the one embodiment, the number of radio frequency receiver chains including local oscillators and the like can be reduced to the number of diverse paths. This leads to reduced hardware and cable requirements and even to a reduced number of base station alarms.

The receiver device may include at least two diverse receiving elements for providing at least two respective diverse receiving paths; diverse combining means for combining the diverse receiving paths; and common diverse receiving means for processing signals received through the combined diverse receiving paths in a common diverse multi-carrier path. In particular, the predetermined angular section may cover about 120 degrees.

Furthermore, each of the combined signals may include a plurality of channel signals. Thus, the multi-carrier receiving means can be used for processing different channel signals received from the same sector as well as from other sectors. Then, the combining means may be adapted to generate a multi-carrier signal by allocating different carriers to the channel signals of the combined signal. The common receiver means may include baseband channelizing means for generating channelized data from each of the channel signals.

Other objects, advantages and salient features of the invention will become apparent from the following detailed description taken in conjunction with the annexed drawings, which disclose preferred embodiments of the invention.

BRIEF DESCRIPTION OF THE DRAWINGS

In the following, embodiments of the present invention will be described in greater detail with reference to the following drawings, in which like reference numerals refer to like elements and wherein.

DESCRIPTION OF THE PREFERRED EMBODIMENTS

Figure 1:
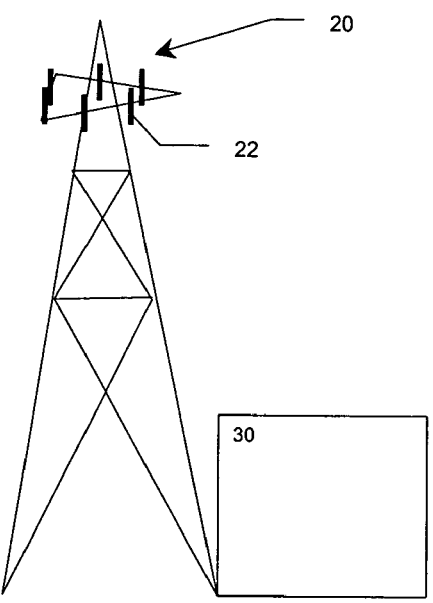
FIG. 1 shows a schematic representation of a base transceiver station with an antenna arrangement, in which the present invention can be implemented.
Figure 2:
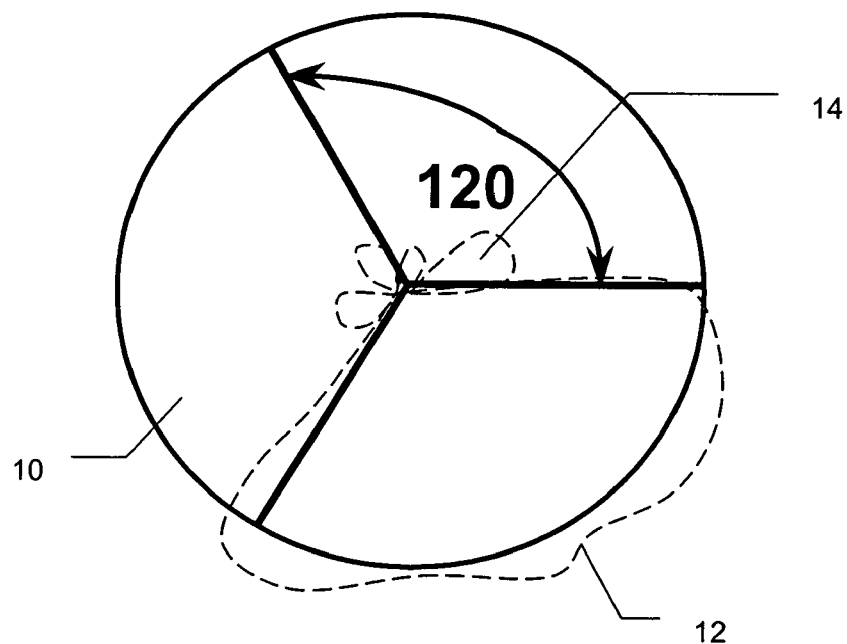
FIG. 2 shows an antenna pattern of the antenna arrangement of FIG. 1.
Figure 3:
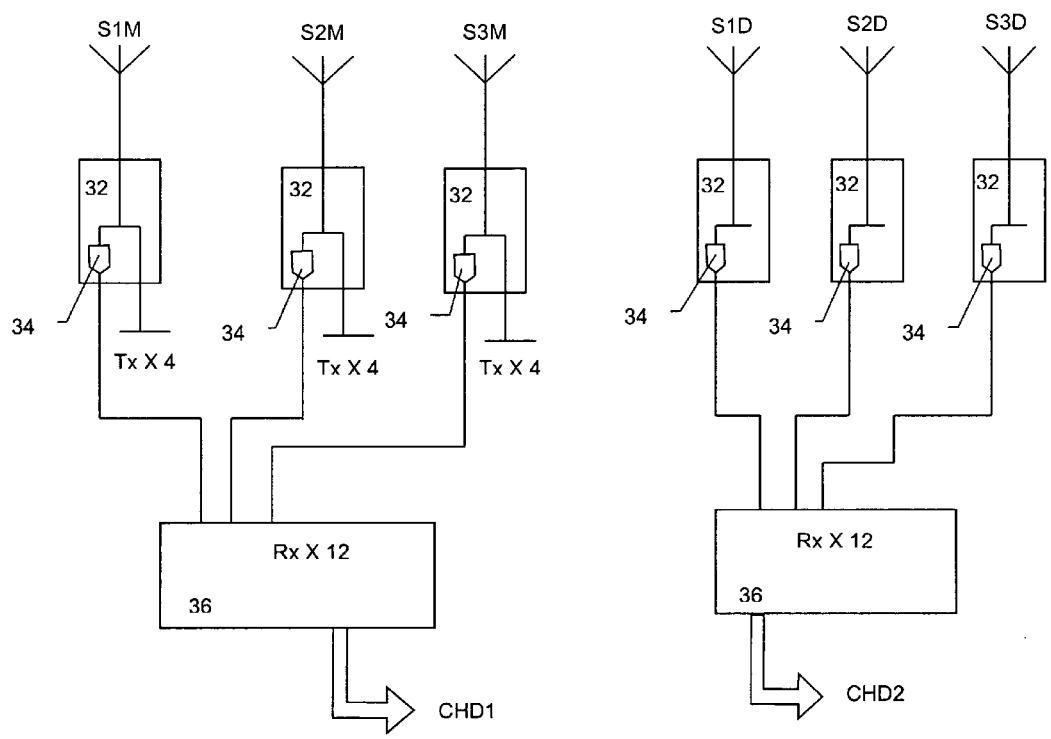
FIG. 3 shows schematic block diagram of a receiver device with main and diverse sector antennas, according to an embodiment of the present invention.

Embodiments of the present invention will now be described on the basis of a sectored base transceiver station architecture such as shown in FIG. 3.

As shown in FIG. 3, the base transceiver station architecture includes three main sector antennas S1M, S2M and S3M and three diverse sector antennas S1D, S2D and S3D forming a diverse path so as to obtain an antenna diversity gain. The main and diverse sector antennas are connected to respective transmit/receive switches 32 arranged to supply uplink signals received from the main and diverse sector antennas to respective multi-carrier receiver units 36, and to supply downlink signals generated at twelve transmitter units (not shown) to respective ones of the main sector antennas S1M, S2M and S3M. In particular, as explained above, four transmitter units may be connected to each of the main sector antennas S1M, S2M and S3M. It is noted that no transmitter units are connected to the transmit/receive switches 32 of the diverse sector antennas S1D, S2D and S3D, which are only used for receiving purposes.

Each of the transmit/receive switches 32 may include a low noise amplifier (LNA) 34 for amplifying the weak receiving signals at a low noise contribution. Each of the signals received from the main and diverse sector antennas may include four channels, so that the respective multi-carrier receiver units 36 are each arranged to process twelve receiving channels via one respective radio frequency (RF) path. In the multi-carrier receiver unit 36, channel signals are combined, frequency-converted to base band frequency, analog-to-digital converted and again channelized in order to obtained channelized digital data CHD1, CHD2.

Figure 4:
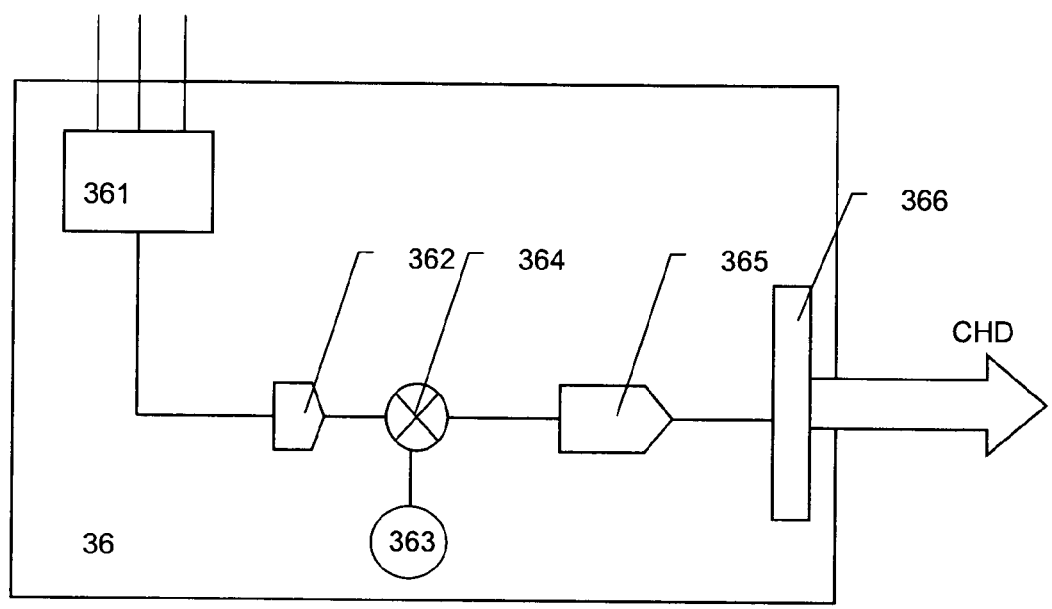
FIG. 4 shows a schematic block diagram of a multi-carrier receiver unit according to an embodiment of the present invention.

FIG. 4 shows a schematic block diagram of the multi-carrier receiver unit 36 that includes a multi-carrier receiving chain and a baseband channelizer.

As shown in FIG. 4, the multi-carrier receiver unit 36 may include a combiner unit 361 that is adapted to combine the channel signals received from each channel of each sector antenna by allocating an individual narrowband carrier to each channel signal and modulating the allocated carrier based on the channel signal. Thus, the received channel signals are carried on their individual carriers through the subsequent single RF path, wherein the bandwidth of the RF path is selected to be sufficient for allowing a parallel transmission of all individual carriers. The generated multi-carrier signal may be supplied to an amplifier and filter circuitry 362 for removing noise and distortion and then to a mixer or multiplier circuit 364 where mixed with a signal supplied from a local oscillator circuit 363 in order to be converted to a lower baseband frequency range. The baseband multi-carrier signal may then be supplied to a filter and analog-to-digital converter circuitry 365 where it is converted into a digital data stream. This data stream may then be supplied to a baseband channelizer unit 366 adapted to re-allocate individual data of the data stream to the respective original channels, so as to obtain channelized data or digits CHD which are further processed in the base transceiver station 30.

Consequently, the received signals of all 24 channels of the main and diverse sector antennas can be received through only two RF chains of the multi-carrier receiver units 36. Thereby, the receiver structure can be simplified to a significant extent. The number of receiver Operations and Maintenance (O&M) alarms needed and generated to determine the correct function of the radio receive part of the BTS can be minimized. Furthermore, the BTS reliability can be increased by reduction of inter connects, solder joints and number of electronic components. Moreover, the C/I (carrier-to-interference ratio) performance for EDGE (Enhanced Data rates for GSM Evolution) signals can be improved by using wideband receivers. In addition, handover of signals from/to different sectors can be improved by using a common receiver and processing.

It is noted, that the present invention is not restricted to the above preferred embodiments, but can be implemented in any receiver device where a plurality of receiving channels of different radio receiving elements have to be combined and processed. The preferred embodiments may thus vary within the scope of the attached claims.

What is claimed is:

1. A receiver device comprising:
   a) at least two receiving elements for receiving radio signals through at least two respective different receiving paths;
   b) combination circuit means for combining signals received through said at least two different receiving paths by allocating an individual narrowband carrier to each received signal; and
   c) common receiver means for processing said combined signals in a common multi-carrier path.

2. A device according to claim 1, wherein said receiving elements are sector antennas for receiving signals only from respective predetermined angular sectors.

3. A device according to claim 2, comprising:
   at least two diverse receiving elements for providing at least two respective diverse receiving paths;
   diverse combining means for combining said diverse receiving paths; and
   common diverse receiving means for processing signals received through said combined diverse receiving paths in a common diverse multi-carrier path.

4. A device according to claim 3, wherein said diverse receiving elements are sector antennas of a diverse antenna arrangement, said sector antennas being adapted for receiving only from respective predetermined angular sectors.

5. A device according to claim 4, wherein said predetermined angular section covers approximately 120 degrees.

6. A device according to claim 5, wherein said receiver device comprises a base transceiver station.

7. A device according to claim 6, wherein each of said combined signals comprises a plurality of channel signals.

8. A device according to claim 2, wherein said predetermined angular section covers approximately 120 degrees.

9. A device according to claim 8, wherein said receiver device comprises a base transceiver station.

10. A device according to claim 9, wherein each of said combined signals comprises a plurality of channel signals.

11. A device according to claim 8, wherein each of said combined signals comprises a plurality of channel signals.

12. A device according to claim 2, wherein said receiver device comprises a base transceiver station.

13. A device according to claim 12, wherein each of said combined signals comprises a plurality of channel signals.

14. A device according to claim 2, wherein each of said combined signals comprises a plurality of channel signals.

15. A device according to claim 3, wherein said predetermined angular section covers approximately 120 degrees.

16. A device according to claim 15, wherein said receiver device comprises a base transceiver station.

17. A device according to claim 16, wherein each of said combined signals comprises a plurality of channel signals.

18. A device according to claim 15, wherein each of said combined signals comprises a plurality of channel signals.

19. A device according to claim 3, wherein said receiver device comprises a base transceiver station.

20. A device according to claim 19, wherein each of said combined signals comprises a plurality of channel signals.

21. A device according to claim 3, wherein each of said combined signals comprises a plurality of channel signals.

22. A device according to claim 4, wherein said receiver device comprises a base transceiver station.

23. A device according to claim 22, wherein each of said combined signals comprises a plurality of channel signals.

24. A device according to claim 4, wherein each of said combined signals comprises a plurality of channel signals.

25. A device according to claim 5, wherein each of said combined signals comprises a plurality of channel signals.

26. A device according to claim 1, comprising:
  at least two diverse receiving elements for providing at least two respective diverse receiving paths;
  diverse combining means for combining said diverse receiving paths; and
  common diverse receiving means for processing signals received through said combined diverse receiving paths in a common diverse multi-carrier path.

27. A device according to claim 26, wherein said diverse receiving elements are sector antennas of a diverse antenna arrangement, said sector antennas being adapted for receiving only from respective predetermined angular sectors.

28. A device according to claim 27, wherein said predetermined angular section covers approximately 120 degrees.

29. A device according to claim 28, wherein said receiver device comprises a base transceiver station.

30. A device according to claim 29, wherein each of said combined signals comprises a plurality of channel signals.

31. A device according to claim 28, wherein each of said combined signals comprises a plurality of channel signals.

32. A device according to claim 27, wherein said receiver device comprises a base transceiver station.

33. A device according to claim 32, wherein each of said combined signals comprises a plurality of channel signals.

34. A device according to claim 27, wherein each of said combined signals comprises a plurality of channel signals.

35. A device according to claim 26, wherein said predetermined angular section covers approximately 120 degrees.

36. A device according to claim 35, wherein said receiver device comprises a base transceiver station.

37. A device according to claim 36, wherein each of said combined signals comprises a plurality of channel signals.

38. A device according to claim 35, wherein each of said combined signals comprises a plurality of channel signals.

39. A device according to claim 26, wherein said receiver device comprises a base transceiver station.

40. A device according to claim 39, wherein each of said combined signals comprises a plurality of channel signals.

41. A device according to claim 26, wherein each of said combined signals comprises a plurality of channel signals.

42. A device according to claim 1, wherein said receiver device comprises a base transceiver station.

43. A device according to claim 42, wherein each of said combined signals comprises a plurality of channel signals.

44. A device according to claim 1, wherein each of said combined signals comprises a plurality of channel signals.

45. A device according to claim 44, wherein said combining means is adapted to generate a multi-carrier signal by allocating different carriers to said channel signals of said combined signals.

46. A device according to claim 45, wherein said common receiver means comprises baseband channelizing means for generating channelized data from each of said channel signals.

47. A device according to claim 44, wherein said common receiver means comprises baseband channelizing means for generating channelized data from each of said channel signals.

48. A method of receiving a radio signal, said method comprising the steps of:
  a) receiving radio signals through at least two respective different receiving paths;
  b) combining signals received through said at least two different receiving paths by allocating an individual narrowband carrier to each received signal; and
  c) processing said combined signals in a common multi-carrier path.

49. A method according to claim 48 comprising:
  allocating a carrier of said common multi-carrier path to each channel signal provided in said combined signals.

50. A method according to claim 49, wherein said received radio signal is an EDGE signal received via a wideband receiver.

51. A method according to claim 50, wherein handover of signals from or to different sectors is performed by using a common receiver and processing.

52. A method according to claim 49, wherein handover of signals from or to different sectors is performed by using a common receiver and processing.

53. A method according to claim 48, wherein said received radio signal is an EDGE signal received via a wideband receiver.

54. A method according to claim 53, wherein handover of signals from or to different sectors is performed by using a common receiver and processing.

55. A method according to claim 48, wherein handover of signals from or to different sectors is performed by using a common receiver and processing.

* * * * *